United States Patent [19]

Schmidt et al.

[11] Patent Number: 5,288,225
[45] Date of Patent: Feb. 22, 1994

[54] PRESSURE BALANCED VALVE STEM

[75] Inventors: Harald Schmidt; Bruce Catoen, both of Georgetown; Michael Dybka, Burlington, all of Canada

[73] Assignee: Husky Injection Molding Systems Ltd., Bolton, Canada

[21] Appl. No.: 991,433

[22] Filed: Dec. 14, 1992

[51] Int. Cl.5 ............................................. B29C 45/23
[52] U.S. Cl. ................................. 425/564; 264/328.9; 425/566; 425/570
[58] Field of Search ............... 425/562, 563, 564, 565, 425/566, 570; 264/328.9

[56] References Cited

U.S. PATENT DOCUMENTS

| | | | |
|---|---|---|---|
| 3,241,191 | 3/1966 | Nouel | 425/563 |
| 3,491,408 | 1/1970 | Natkins | 425/563 |
| 4,095,931 | 6/1978 | Reitan | 425/564 |
| 4,173,448 | 11/1979 | Rees et al. | 425/564 |
| 4,330,258 | 5/1982 | Gellert | 425/564 |
| 4,786,246 | 11/1988 | Gellert | 425/562 |

*Primary Examiner*—Tim Heitbrink
*Attorney, Agent, or Firm*—Bachman & LaPointe

[57] ABSTRACT

Apparatus includes a mold cavity and a molten plastic inlet channel for communication with the mold cavity for transmission of molten plastic to the mold cavity. A valve stem is provided with substantially no net resulting forces on the valve stem due to melt pressure acting on the projecting area of its upstream and downstream faces.

10 Claims, 3 Drawing Sheets

PRESSURE BALANCED VALVE STEM

BACKGROUND OF THE INVENTION

Typical hot runner valve gated nozzles in plastic molding systems use a single central melt channel to convey the resin from a supply channel in a hot runner manifold to the mold cavity gate. A valve stem is generally employed which is a small diameter rod that is positioned centrally in the nozzle's melt channel and reciprocates to control the opening and closing of the valve gate.

Hot runner valve gate systems use a variety of mechanisms to operate the valve stem. U.S. Pat. Nos. 4,786,246 and 3,241,191 use an external moving mold plate to operate the valve stem. U.S. Pat. No. 4,330,258 uses an externally operated rack to drive a gear which in turn via a thread moves the stem. U.S. Pat. No. 4,173,448 to Rees et al. uses a double acting air operated piston to move the stem. These references all positively move the stem to an open or closed position by using some external means operating on the stem.

Some devices, typically using springs, provide single acting forces to close the stem. Opening the stem is performed by the pressure of the resin in the nozzle assembly. Examples of this type are shown in U.S. Pat. Nos. 3,491,408 and 4,095,931, which uses a cam to close the stem. Further examples of this type of device miniaturize the stem/spring assembly to fit inside the nozzle. These are shown in U.S. Pat. Nos. 3,677,682 and 4,171,941.

All of the above devices are limited in size of gate opening that can be provided. Typically the valve stem must be operated to close the gate immediately after injection or hold pressures have been reached. These pressure values can be as much as 20,000 psi and accordingly the projected area of the valve stem, and hence the gate diameter it can close, is limited by the amount of external force that can be applied to close the stem against this resisting melt pressure. For example a typical 0.060" diameter gate at 20,000 psi will exert a force of 245 lbs. against a valve stem of 0.125" diameter. Thus an air piston operating at a nominal 80 psi air supply pressure must be approximately 2" diameter to develop sufficient force to close the valve. Obviously a larger diameter gate and stem would require greater forces, this in turn would require larger air piston diameters or using hydraulic pistons operating at higher fluid pressures, or alternately mechanical cam or rack and gear mechanisms. These alternate methods all have disadvantages. Hydraulic circuits in close proximity to heated mold components invite the risk of fire. Mechanical methods, like larger diameter air pistons, rack and gear drives and cams, take up a lot of space in the structure of the mold and are prone to seizing or failure since they must operate on components that thermally expand and physically move out of their cold condition alignment.

Large diameter valves, providing larger gate opening sizes, are shown in U.S. Pat. Nos. 4,808,106 and 5,002,480. The '106 reference relies on the deflection of the valve material itself to open and close the valve, whereas the '480 reference uses a sliding stem. The operation of the valve is performed by controlling the melt pressure itself. This greatly limits the usefulness of the valve since accurate melt pressure control in the midst of a molding cycle may not be accurate enough to effect opening or closing the valve at the optimum points in the cycle.

U.S. Pat. No. 5,098,280 shows a sliding gate needle contained within the hot runner nozzle. The needle is not a valve gate and cannot operate to shut off the resin flow, rather it is a heat conducting means to maintain the melt temperature in the gate area. The needle is able to slide back and forth within the nozzle by virtue of the melt pressure acting on each side of the stem's structure.

Accordingly, it is a principal object of the present invention to provide an improved injection molding apparatus which utilizes a pressure balanced valve stem.

It is a still further object of the present invention to provide an improved apparatus as aforesaid which is versatile, enables the use of large valve gates, does not result in delay of the molding cycle and enables precise control of the gate in a simple, convenient and expeditious manner.

Further objects and advantages of the present invention will appear hereinbelow.

SUMMARY OF THE INVENTION

In accordance with the present invention, the foregoing objects and advantages may be readily obtained.

The apparatus of the present invention comprises: a mold cavity; a molten plastic inlet channel defining an outer end for communication with a source of molten plastic and an inner end for communication with the mold cavity for transporting molten plastic from the outer end to the mold cavity; a valve gate between the mold cavity and inlet channel inner end and a reciprocable valve stem movable from a first position closing the valve gate to a second position opening the valve gate; wherein said stem has an upstream end region adjacent the inlet channel outer end exposed to pressure of molten plastic and a downstream end region adjacent the inlet channel inner end exposed to pressure of molten plastic, wherein the upstream and downstream end regions are exposed to substantially equal and opposite forces due to molten plastic pressure; and means for moving the valve stem from closed to open position and from open to closed position.

In one embodiment the stem has at least one upstream face adjacent the inlet channel outer end and at least one downstream face adjacent the inlet channel inner end, with the projected area of the upstream face exposed to melt pressure being substantially equal to the projected area of the downstream face exposed to melt pressure. By projected area is meant the area of the object, for example, the valve stem, that would be visible when viewed from a particular vantage point, in this case from the longitudinal axis or centerline of the valve stem. The inlet channel outer end may define an upstream chamber facing the upstream face of the valve stem, and the inlet channel inner end may define a downstream chamber facing the downstream face of the valve stem. The inlet channel may be laterally offset (on one or more sides) from the valve stem between the upstream and downstream chambers. The means for moving the valve stem may be any convenient motive means and is connected to the valve stem between the upstream and downstream faces thereof.

The inlet channel is contained within an injection nozzle with the valve stem mounted in the nozzle and reciprocating between the upstream chamber and downstream chamber. Heating means are generally contained in the nozzle which is generally adjacent a cooled mold plate and insulated therefrom.

Further features and advantages of the present invention will appear hereinbelow.

BRIEF DESCRIPTION OF THE DRAWINGS

The features of the present invention will be more readily understandable from a consideration of the following illustrative embodiments in which.

DETAILED DESCRIPTION OF THE PREFERRED EMBODIMENTS

Figures 1, 2:
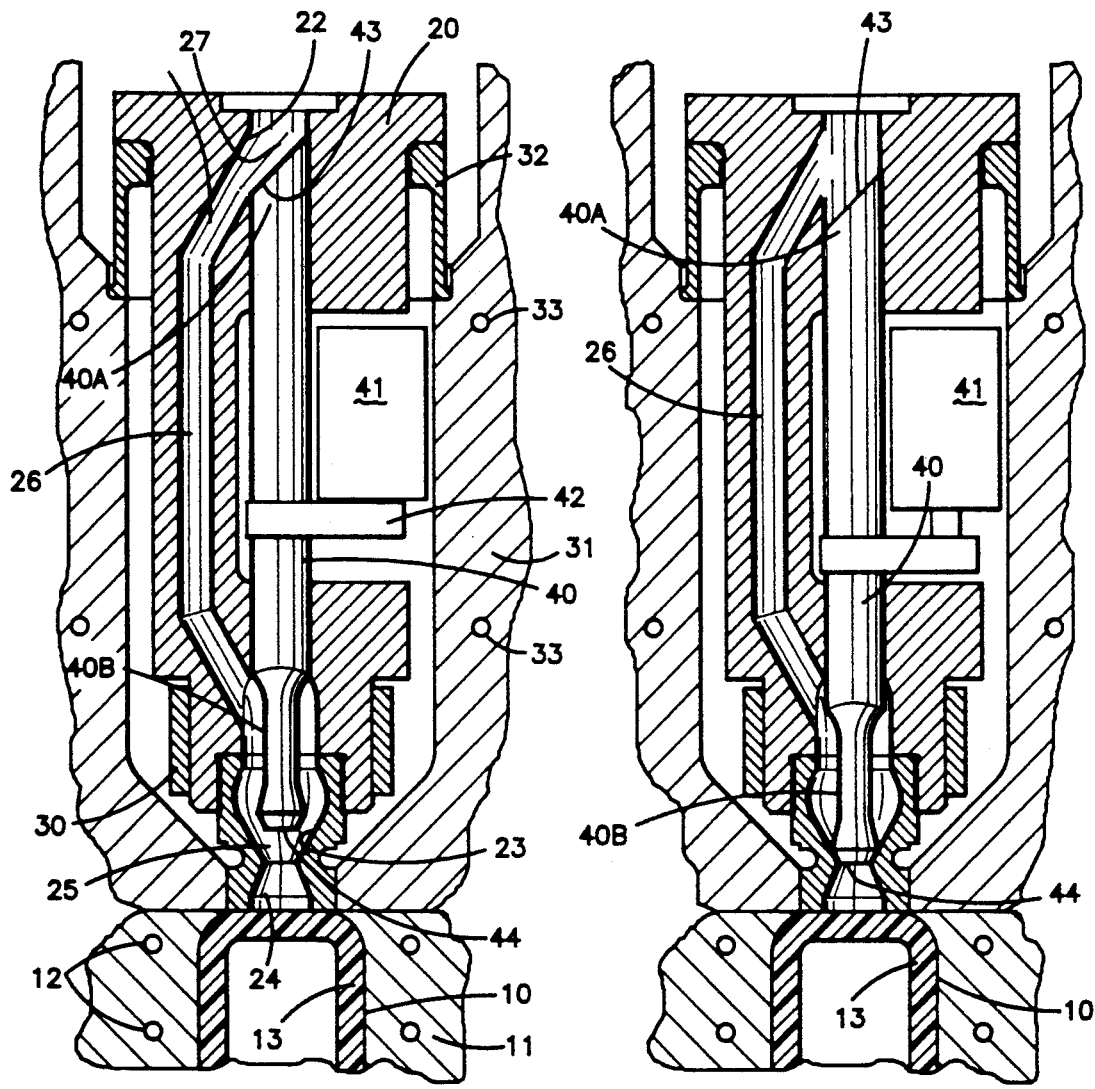
FIG. 1 is a cross-sectional view of a valve gated nozzle assembly of the present invention, in the open position.
FIG. 2 is a cross-sectional view of the nozzle assembly of FIG. 1 in the closed position.

FIGS. 1 and 2 show a representative embodiment of the present invention, with FIG. 1 showing the valve gate open and the movable valve stem retracted and FIG. 2 showing the gate closed and the valve stem in the forward position adjacent the valve or mold gate. For simplicity, only a single mold cavity has been shown; however, it should be understood that the apparatus of the present invention is particularly suitable for multicavity molds wherein the system shown in FIGS. 1 and 2 would be duplicated for each mold cavity.

Referring to the preferred embodiments of FIGS. 1 and 2, mold cavity 10 is contained in mold plate 11 containing cooling channels 12, for forming injection molded plastic article 13. Nozzle body 20 includes a molten plastic inlet channel 21 for transporting molten plastic from a source of molten plastic (not shown) to mold cavity 10. Inlet channel 21 includes an outer end 22 for communication with the source of molten plastic (not shown) and an inner end 23 for communication with the mold cavity 10. Valve gate 24, desirably a large diameter orifice, is located between mold cavity 10 and the inner end 23 of inlet channel 21 in communication with both the mold cavity and the inner end of the inlet channel.

Nozzle body 20 may be heated by heater 30, although other heating means and additional heaters may readily be used, and is located in and thermally insulated from cooled mold plate 31, as by insulator 32 or any other desired insulating means as by air gaps. Mold plate 31 may be cooled by cooling channels 33 or by any desired cooling means. Mold plates 11 and 31 coact and appropriate means are provided to allow access to mold cavity 10 to allow removal of molded part 13, as by making one of the mold plates movable.

Valve stem 40 slides within nozzle body 20 and is moved by any desired motive means, as in this case electromagnet 41 connected to a source of power (not shown) and to valve stem 40 by connecting plate 42. Valve stem 40 has an upstream end region 40A adjacent the inlet channel outer end 22 and a downstream end region 40B adjacent the inlet channel inner end 23, with both end regions being exposed to molten plastic pressure. Valve stem 40 has an upstream face 43 adjacent inlet channel outer end 22 and a downstream face 44 adjacent inlet channel inner end 23. Connecting plate 42 is connected to the valve stem between upstream face 43 which may for example be an angled face and downstream face 44, which may for example be a flat face.

The valve stem 40 is movable from the open position shown in FIG. 1 to the closed position shown in FIG. 2 by electromagnet 41 forming in effect a floating valve stem. The projected area of the upstream face 43 is substantially equal to the projected area of the downstream face 44 to expose both areas to substantially equal resin pressures in this embodiment.

As can be seen from FIGS. 1 and 2, inlet channel outer end 22 defines an upstream chamber 27 facing upstream face 43 of valve stem 40 and inlet channel inner end 23 defines a downstream chamber 25 facing the downstream face 44 of valve stem 40. Also, inlet channel 21 is laterally offset from the valve stem between the upstream and downstream chambers by offset passage 26. Only one of the offset passages has been shown, but it should be understood that others can be employed if desired.

Figure 3:
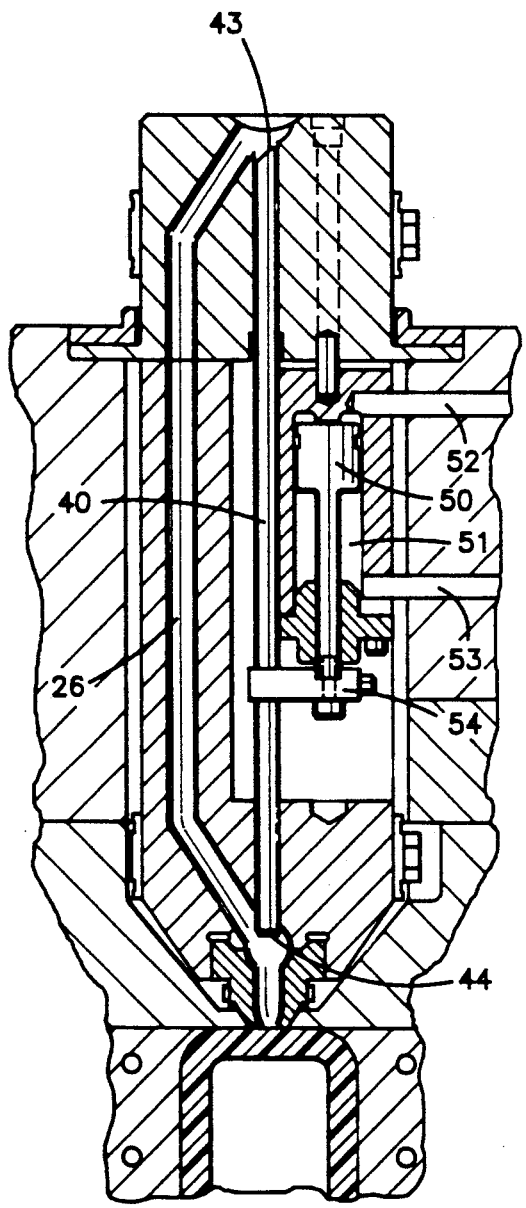
FIGS. 3-4 are cross-sectional views similar to FIGS. 1-2 of an alternate embodiment of the present invention.
Figure 4:
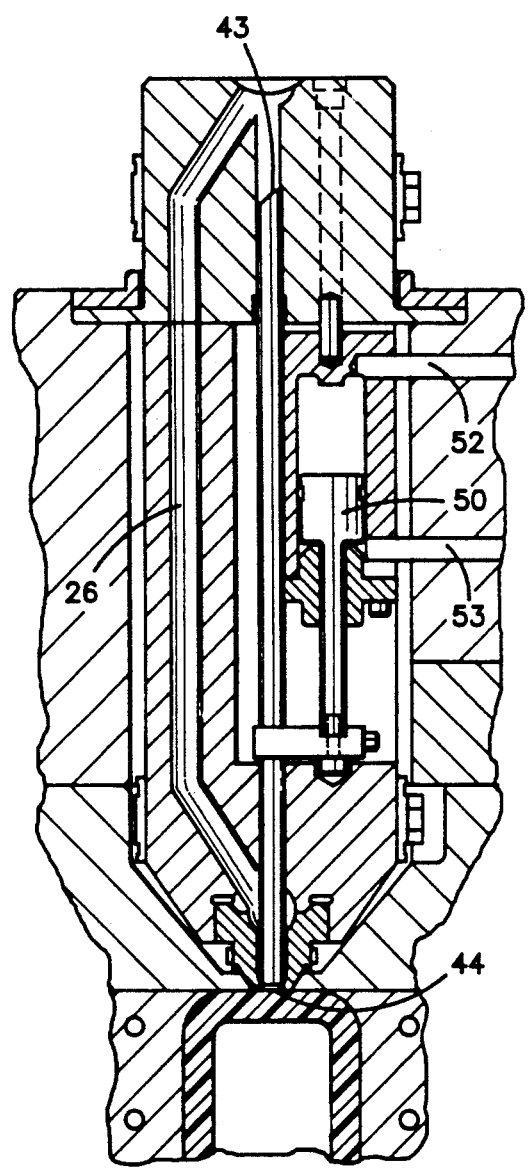

FIGS. 3 and 4 show an alternate stem and gate design using a different operating means. In this case, valve stem 40 is connected to air piston 50 which moves within enclosed cylinder 51 by compressed air supplied through ports 52 and 53 to provide double acting motion to valve stem 40. Piston 50 is connected to valve stem 40 by plate 54 between the upstream face 43 of valve stem 40 and the downstream face 44 of valve stem 40. FIG. 3 shows the valve stem in the open position and FIG. 4 shows the valve stem 40 in the closed position.

In operation, it is apparent that the resin pressure can act on both ends of the floating valve stem 40. Immediately opposite inlet channel outer end 22 and adjacent upstream chamber 27, the upstream face 43 of valve stem 40 is exposed to melt pressure, while at the same time downstream face 44 of stem 40 is also exposed to melt pressure. By insuring that the projected areas of these exposed ends are substantially equal, there is no residual force applied to the stem resulting from melt pressure which is substantially equal in this embodiment. Naturally, small variations in area may readily be tolerated when melt pressure is substantially equal in the upstream chamber 27 and the downstream chamber 25. Consequently, the force required to open or close the stem must be sufficient only to overcome the friction forces in the system. Naturally, the larger the variation in projected areas the greater the force required so that in this embodiment these areas are preferably as close to being equal as possible. A small air piston or small electromagnet is sufficient to perform this task and can be accommodated within the valve body unit, thereby eliminating the need for external mold space to house the drive means. It has been demonstrated that very small forces are required to operate the stem while it is subjected to high melt pressures (20,000 psi). In typical molding cycles, the gate is opened before full injection pressure is developed. Obviously when the gate is closed an increase in melt pressure will exert a closing force on the stem because the forward projected area of the stem is not subjected to the melt pressure. This does not delay the molding cycle because only a partial opening of the stem is required in order to expose its forward projected area to melt pressure and consequently injection can begin almost the instant the opening action has been initiated. Obviously very large diameter gates and valves can be constructed using this principle since the force required to operate them is no longer based on their projected area exposed to melt pressure. Sizes of 1.0" and larger can be used for the valve gating of very large molded parts where previously multiple gates were required. This represents a significant saving in mold construction costs. Also very large diameter gates assist in the molding or stress free parts and in improving molding cycles.

Furthermore, the control of the gate is precise since a double acting means, independent of melt pressure, is used.

This design is applicable to stack molds where to date valve gating has been problematic because of the very limited space available to accommodate the driving means.

Figures 5, 6:
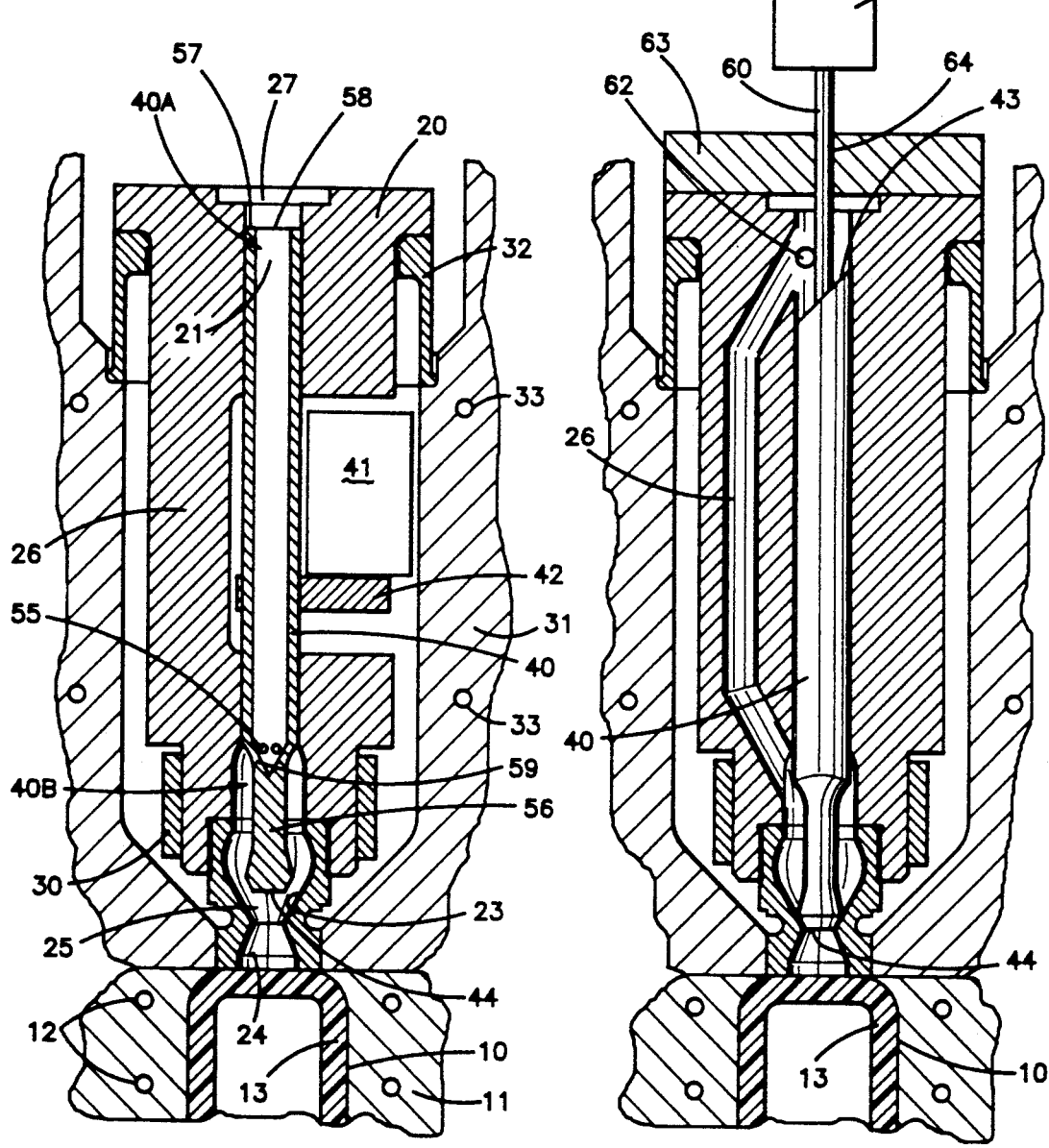
FIGS. 5-6 are cross-sectional views similar to FIGS. 1-2 of alternate embodiments of the present invention.

FIG. 5 shows an alternate stem and valve design wherein valve stem 40 incorporates an internal molten plastic inlet channel 21 for conveying molten resin from a source of molten resin to large diameter valve gate 24. Downstream chamber 25 is connected to melt channel 21 by downstream ports 55. Downstream ports 55 allow the melt to flow from melt channel 21 to downstream chamber 25. Valve stem body 56 is connected to valve stem 40 adjacent inner end 23 by connecting ribs 59, or any other suitable means. Valve stem 40 defines annular exposed upstream face 57 adjacent upstream chamber 27 at the inlet end 58 of valve stem 40.

In operation, it is evident that all surfaces with a component essentially perpendicular to the center line axis of stem 40 (including stem body 56 and including components situated at an angle with respect to the centerline) will be exposed to the surrounding melt pressure creating the balanced forces on the valve stem and stem body in much the same manner as that described in FIGS. 1-2. It is the pressure acting on the surfaces with components perpendicular to the axis of a generally cylindrical body that will result in unbalanced forces if (a) said pressure is not substantially uniform on all such surfaces and/or (b) the area of such surfaces is unequal to a significant extent. The melt pressures encountered in both the upstream chamber 27 and downstream chamber 25 in a typical injection molding process are substantially equal. Making the exposed projected area of the valve stem upstream end region 40A substantially equal to the exposed projected area on the valve stem downstream end region 40B (including the valve stem body 56), will produce no net force acting on the total valve stem. Consequently, the forces required to open or close the stem must only be sufficient to overcome the frictional forces on the system. Actuation of the valve stem 40 may be accomplished by an desired means, as in FIG. 5 by electromagnet 41 connected to a source of power (not shown) and to valve stem 40 by connecting plate.

Incorporating the melt channel 21 into the valve stem 40 simplifies the construction of the nozzle body 20 and allows for a compact nozzle assembly. It also provides a direct flow path for the melt with a comparatively minor pressure drop through the ports 55, which can be compensated for by enlarging the projected area of the downstream end of the valve stem.

A consequence of the embodiment of FIG. 5 is that the valve stem 40 is pressurized. This will lead to deformation of the stem when the full melt pressure is applied. The increase in size can be minimized by manufacturing a hollow stem with sufficient wall thickness. The increase would not substantially affect the advantages noted hereinbelow.

FIG. 6 shows another alternate design where actuation of stem 40 can be accomplished in a more conventional manner. Actuating rod 60 is joined to upstream face 43 of valve stem 40 and extends through nozzle end plate 63 via mating bore 64. Valve stem 40 is operated by any suitable actuator 61 through actuating rod 60. Melt enters from a resin supply source (not shown) through opening 62.

In this design, the effective area exposed to melt pressure on both ends of the stem are substantially the same. The upstream end face 43 may be made a larger diameter to compensate for the area occupied by the diameter of the actuating rod 60. The advantage of this design is that the entire assembly can be made more compact since the actuator and connecting plate are no longer beside the nozzle assembly. This allows a plurality of nozzles to be spaced closer together. It also allows a combination or all nozzles to be actuated via a common actuating member.

Thus, in accordance with the present invention one can hydraulically balance the forces due to melt pressure acting on the valve stem with respect to the axial projected area exposed to melt pressure on each end of the stem. As long as such areas are substantially equal then the resulting forces will be balanced. The forces acting on the upstream and downstream end regions of the valve stem should be substantially equal and opposite so that no net force results. Where the upstream and downstream pressures are not substantially equal, the projected area of the upstream and downstream faces can naturally be sized to result in substantially equal and opposite forces due to molten plastic pressure.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. Injection molding apparatus comprising:
   a mold cavity;
   a molten plastic inlet channel defining an outer end for communication with a source of molten plastic and an inner end for communication with said mold cavity for transporting molten plastic from the outer end to the mold cavity;
   a valve gate between the mold cavity and inlet channel inner end and a reciprocable valve stem movable from a first position closing the valve gate to a second position opening the valve gate;
   wherein said stem has an upstream end region adjacent the inlet channel outer end exposed to upstream pressure of said molten plastic and a downstream end region adjacent the inlet channel inner end exposed to downstream pressure of said molten plastic, wherein the upstream and downstream pressures are substantially equal and opposite due to said end regions being of substantially equal surface area; and
   means for moving the valve stem from closed to open position and from open to closed position.

2. Apparatus according to claim 1 wherein the inlet channel defines an upstream chamber adjacent the upstream face of the valve stem, and the inlet channel inner end defines a downstream chamber adjacent the downstream face of the valve stem.

3. Apparatus according to claim 2 wherein the inlet channel includes at least a portion thereof laterally offset from the valve stem between the upstream and downstream chambers.

4. Apparatus according to claim 3 wherein the means for moving the valve stem is connected to the valve stem between the upstream and downstream faces.

5. Apparatus according to claim 3 wherein said inlet channel is contained within an injection nozzle and wherein the valve stem is mounted in the injection nozzle and reciprocates between the upstream and downstream chambers.

6. Apparatus according to claim 5 including heating means in the injection nozzle.

7. Apparatus according to claim 6 wherein the injection nozzle is adjacent at least one cooled mold plate and insulated therefrom.

8. Apparatus according to claim 1 wherein the valve stem incorporates an internal molten plastic inlet channel.

9. Apparatus according to claim 8 wherein said inlet channel defines an essentially straight molten plastic flow path.

10. Apparatus according to claim 1 including an actuating rod connected to the upstream end region of the valve stem.

* * * * *